(12) United States Patent
Klein

(10) Patent No.: US 6,401,209 B1
(45) Date of Patent: Jun. 4, 2002

(54) METHOD FOR AUTOMATICALLY INITIATING A COMPUTER SECURITY AND/OR SCREEN SAVER MODE

(75) Inventor: Dean Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/037,360

(22) Filed: Mar. 9, 1998

(51) Int. Cl.[7] ............................................. G06F 11/00
(52) U.S. Cl. ...................................... 713/200; 380/25
(58) Field of Search ................................ 713/200, 201, 713/202; 380/4, 23, 25; 382/118, 119; 340/825.34; 235/382.5, 382, 380

(56) References Cited

U.S. PATENT DOCUMENTS

| | | | | |
|---|---|---|---|---|
| 4,947,765 A | * | 8/1990 | Biedess ........................ 109/6 |
| 5,007,085 A | * | 4/1991 | Greanias et al. ............. 380/25 |
| 5,377,269 A | * | 12/1994 | Heptig et al. ................ 380/25 |
| 5,408,536 A | * | 4/1995 | Lemelson ...................... 382/2 |
| 5,548,764 A | * | 8/1996 | Duley et al. ................ 395/750 |
| 5,574,424 A | * | 11/1996 | Nguyen ....................... 340/426 |
| 5,629,981 A | * | 5/1997 | Nerlikar ...................... 380/25 |
| 5,752,044 A | * | 5/1998 | Crump et al. .............. 395/750 |
| 5,835,083 A | * | 11/1998 | Nielsen et al. .............. 345/211 |
| 5,848,231 A | * | 12/1998 | Teitelbaum et al. ........ 395/186 |
| 5,887,131 A | * | 3/1999 | Angelo ................... 395/188.01 |
| 5,949,882 A | * | 9/1999 | Angelo ....................... 380/25 |
| 5,959,530 A | * | 9/1999 | Lupien, Jr. et al. ....... 340/568.1 |
| 5,983,273 A | * | 11/1999 | White et al. ................ 709/229 |
| 6,070,240 A | * | 5/2000 | Xydis ........................ 395/186 |
| 6,088,450 A | * | 7/2000 | Davis et al. .................. 380/25 |
| 6,189,105 B1 | * | 2/2001 | Lopes ......................... 713/202 |
| 6,282,655 B1 | * | 8/2001 | Given ......................... 713/200 |
| 6,308,272 B1 | * | 10/2001 | Pearce ........................ 713/200 |

* cited by examiner

Primary Examiner—Nadeem Iqbal
(74) Attorney, Agent, or Firm—Dorsey & Whitney LLP

(57) ABSTRACT

A method for automatically switching a computer to a password protected screen saver mode when a computer user leaves the proximity of the computer. A proximity sensor determines whether or not an individual is located proximate the computer. The proximity sensor interfaces with either the computer a bus bridge, a keyboard controller, a keyboard, or some another component of the computer to cause the computer to start executing a screen saver program responsive to an output signal from the proximity sensor. A variety of proximity sensors may be used, including ultrasound, infrared, or electromagnetic proximity sensors. A proximity sensor may also detect the presence of a computer user by detecting the weight of the user at a location proximate the computer.

27 Claims, 5 Drawing Sheets

METHOD FOR AUTOMATICALLY INITIATING A COMPUTER SECURITY AND/OR SCREEN SAVER MODE

TECHNICAL FIELD

These inventions relate to a method of operating computers, and more particularly, to a method for causing a computer to automatically switch to a screen saver and/or secure operating mode when a computer user leaves the computer.

BACKGROUND OF THE INVENTION

Computers, and, more particularly, personal computers, are in widespread use in the home and workplace. Such computers are commonly used to record or process information that the user of the computer desires to maintain confidential. Confidential information present in a computer is typically maintained confidential by placing the computer in a password protected "screen saver" mode. Once the computer has transitioned from a normal operating mode to the password protected screen saver mode, information recorded in the computer can be accessed only after the correct password has been entered by typing the password on a keyboard of the computer. If only authorized users of the computer know the password, the confidential information will be accessible only to authorized users.

Computers typically automatically switch from the normal operating mode to the password protected screen saver mode after a predetermined period has elapsed since an input device for the computer was last manipulated. Thus, if a user stops using the computer for the predetermined period, the computer automatically switches to the password protected screen saver mode. Generally, the user sets the predetermined period that must lapse before the computer transitions to the screen saver mode. The user may also generally switch the computer to the password protected screen saver mode by pressing a predetermined combination of keys on the keyboard.

Although computers that are capable of operating in the above-described password protected screen saver mode adequately safeguard confidential information in many instances, it nevertheless has several disadvantages. In particular, if the delay period set by the user to switch the computer to the screen saver mode is excessively long, the computer may be left in the normal operating mode for a considerable period after an authorized user leaves the computer. Individuals who are not authorized to receive such information may then access confidential information present in the computer. It is often difficult if not impossible to select a single delay period that will optimally safeguard confidential information. The delay period should ideally be set to correspond to the period of time that an authorized user may be present at the computer without using the computer. However, this period may vary considerably. Therefore, confidential information can normally be adequately safeguarded only by selecting a very short delay period, i.e., on the order of a few minutes. Alternatively, the computer user can manually switch the computer to the password protected screen saver mode by pressing the predetermined combination of keys on the keyboard.

Each of the above-described alternatives has serious drawbacks. Selecting a period that is short enough to adequately safeguard confidential information will often cause the computer to switch to the screen saver mode even though the authorized user is still present at the computer, particularly if the user performs other duties while present at the computer. For example, the computer may switch to the password protected screen saver mode while the user is engaging in a telephone conversation. A short delay period will therefore require the computer user to repeatedly type in the password throughout the day, possibly every time the computer is to be used. Requiring that the password be entered many times throughout the day can waste a significant amount of time, and is thus very annoying to many people.

The other alternative, i.e., relying on the user to type the predetermined combination of keys to switch the computer to the password protected screen saver mode, may fail to adequately protect confidential information. In particular, the computer user may forget to switch the computer to the screen saver mode. The computer user may also choose not to switch the computer to the screen saver mode because he or she expects to be absent from the computer for only a brief period of time. However, the computer user may greatly underestimate the amount of time that he or she will be absent from the computer. In either case, the computer is left unattended in the normal operating mode, thereby making the confidential information readily accessible to unauthorized individuals.

There is therefore a need for a method of operating a computer using a password protected screen saver in a manner that adequately protects confidential information accessible on the computer, and that does so without significantly inconveniencing authorized users of the computer.

SUMMARY OF THE INVENTION

A screen saver method controls the operating mode of a computer to automatically switch the computer to a screen saver mode when a computer user leaves the proximity of the computer. The screen saver mode is preferably one that requires the user to enter a password before the computer will function in a normal manner. The method includes detecting whether a person is located proximate the computer, and causing the computer to execute a screen saver program responsive to detecting that the person is not located proximate the computer. The act of detecting whether a person is located proximate the computer may include detecting whether there is movement of an object proximate the computer, or detecting whether light, sound, or electromagnetic energy broadcast adjacent the computer is reflected from a person proximate the computer. The act of detecting whether a person is located proximate the computer may also include detecting the weight of the person at a predetermined location proximate the computer.

DETAILED DESCRIPTION OF THE INVENTION

Figure 1:
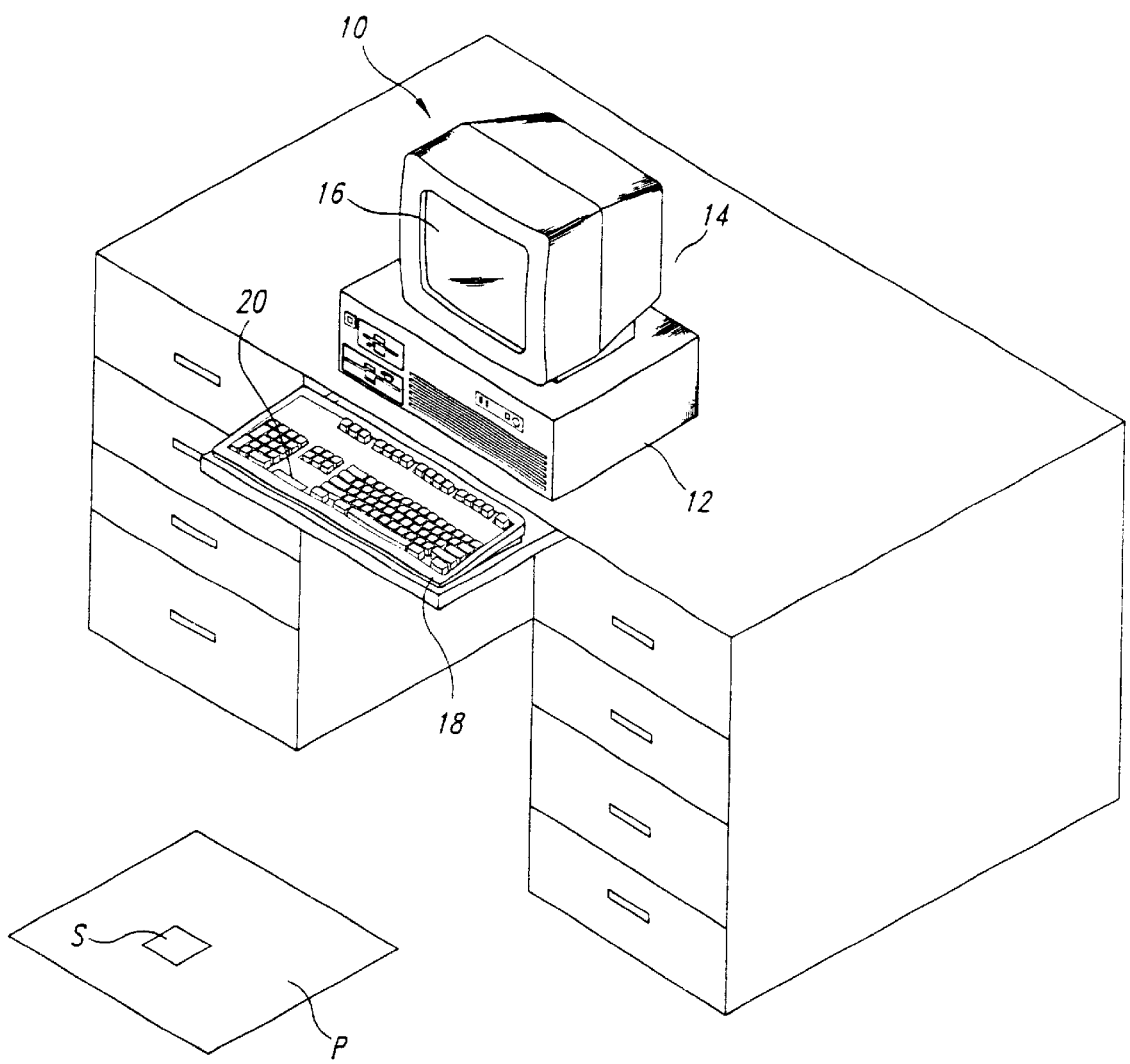
FIG. 1 is an isometric view of a computer that may be operated according to various embodiments of the inventive method in which the computer is positioned on a desk proximate a workspace that may be occupied by an individual.

A computer 10 that operates according to one embodiment of the inventive method is shown in FIG. 1. The computer 10 is placed on the top of a desk D in front of a workspace W positioned behind the desk D that is sometimes occupied by a computer user. Thus, when the computer user is at the workspace W, the user is positioned proximate the computer 10. The workspace W may also include a floor pad P adapted to support a chair on which the computer user may sit while occupying the workspace W to work on the computer 10.

The computer 10 includes a computer chassis 12 of convention design, a convention cathode ray tube ("CRT") monitor 14 having a CRT screen 16, and a conventional keyboard 18, all of which are placed on the desk D. The keyboard 18 also contains a proximity sensor 20 that detects whether or not the computer user is present at the workspace W proximate the computer 10. However, in different embodiments, the proximity sensor could alternatively be mounted in the chassis 12, monitor 14, or any other location that is proximate an user operating the computer 10. Also, the computer 10 could have different components, such as a mouse or other pointing device (not shown) or a unitary chassis, keyboard, and display as in a laptop computer (not shown).

The computer 10 operates in accordance with an operating system, such as a windows-based operating system like Microsoft Windows® operating system. A number of applications programs, such as a word processor, spreadsheet, database, etc., will also generally be installed on the computer 10. The operating system will generally include a "screen saver" program, although a separate "screen saver" application program may also be loaded on the computer 10. In either case, the "screen saver" program causes a stationary or moving image to be displayed on the screen 16 of the monitor 14 in place of an image that would otherwise be displayed by the operating system or currently executing application program. The "screen saver" normally starts running automatically after a user selectable period of time has elapsed since an input device, e.g., the keyboard 18, was manipulated by the computer user. However, the user may manually cause the computer 10 to start executing the screen saver program by pressing a predetermined combination of keys on the keyboard 18, such as control, shift, and function "F" keys.

The screen saver program, whether a part of the operating system or an application program, can generally operate in either of two modes, namely an unprotected mode or a password protected mode. In the unprotected mode, the computer 10 stops executing the screen saver program whenever the computer user manipulates an input device, such as the keyboard 18. The computer 10 then resumes executing whatever program it was executing when the computer 10 started executing the screen saver program. In the password-protected mode, the screen saver does not stop executing the screen saver program unless the computer user correctly types in a secret password. If the user types the correct password, the computer 10 will discontinue executing the screen saver program and resume executing whatever program it was executing when the computer 10 started executing the screen saver program. If the user is unable to type the correct password, the computer 10 will not execute any application program regardless of what keys are pressed or other action is taken by the user. Although the various embodiments of the invention may be used with a screen saver program operating in either the unprotected mode or the password protected mode, it is most valuable when the screen saver program is operating in the password protected mode.

As explained above, computer users often unintentionally leave their workstations with their computers executing an applications program for a variety of reasons. Whatever the reason, leaving a computer 10 unattended without switching it to a password protected screen saver mode can result in disclosure of confidential information to unauthorized individuals. If the computer user does enable the computer to automatically switch to the password protected screen saver mode, the computer user may be required to repetitively enter the password throughout the day, even though the computer user may have never left the workstation.

None of the above-described situations is desirable, and the various embodiments of the invention are directed to solving all or some of these problems. In particular, the computer 10 shown in FIG. 1 is operated in a manner that avoids the above-described problems by using the proximity sensor 20 to determine whether or not the individual is present at the workspace W proximate the computer 10. If the individual is present at the workspace W, the computer 10 continues to execute the operating system or application program without executing the screen saver program. When the individual leaves the workspace W, the proximity sensor 20 detects the absence of the individual from the workspace W and causes the computer 10 to execute the screen saver, either immediately or after a predetermined delay. Alternatively, the computer 10 may begin executing the screen saver before the user leaves the workspace W, but it does not operate in a password protected mode until the proximity sensor 20 detects that the user has left the workspace W.

The proximity sensors 20 may be any of a variety of conventional or subsequently developed proximity sensors. For example, the proximity sensor 20 may broadcast sound (ultrasound or at another frequency), light (infrared or at another wavelength), electromagnetic energy, etc., and detect whether or not the sound, light, electromagnetic energy, etc. is reflected from an individual present at the workspace W. The proximity sensor 20 may detect the presence of the individual at the workspace W either directly or by detecting movement of the individual at the workspace W. Proximity sensors 20 other than reflective proximity sensors mounted on or near the keyboard 18 or other component of the computer 10 may also be used. For example, a weight sensor S (FIG. 1) placed under the floor pad P may be used to detect the presence of the individual sitting in a chair on the floor pad P. Thus, the term "proximity sensor" is intended to encompass any device that determines whether or not the individual is proximate the computer 10.

Figure 2:
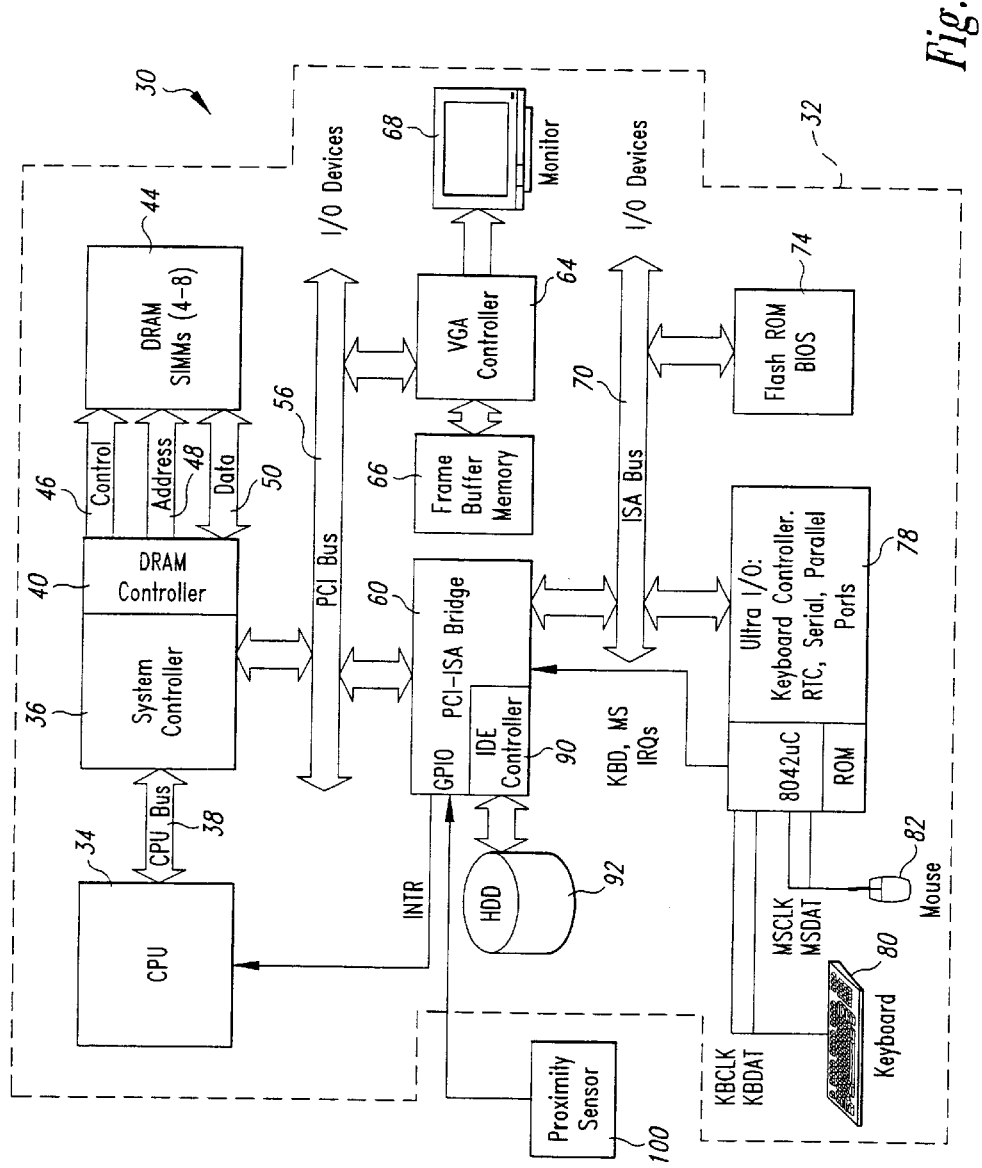
FIG. 2 is a block diagram of an electronic system that operates in accordance with one embodiment of the inventive method by interfacing a computer with a proximity sensor through a PCI-ISA bus bridge.

One embodiment of an electronic password protected screen saver system 30 that may operate in according to one embodiment of the invention is illustrated in FIG. 2. Most of the system shown in FIG. 2 is conventional. The system 30 includes a conventional computer system 32 including a CPU 34 coupled to a system controller 36 through a CPU bus 38. The system controller 36 includes a DRAM controller 40 that couples the CPU 34 to a dynamic random access memory ("DRAM") 44 through a control bus 46, an address bus 48, and a data bus 50. The system controller 36 also couples the CPU 34 to a peripheral component interconnect ("PCI") bus 56. The PCI bus 56 may be coupled to a variety of input output (I/O) devices as well as to a PCI-ISA bus bridge 60. The PCI bus 56 is also coupled to a video graphics accelerator ("VGA") controller 64 that interfaces with both a frame buffer memory 66 and a cathode ray tube ("CRT") monitor 68. As is well known in the art, the PCI bus 56 is a relatively high speed bus, and, in conjunction with the VGA controller 64, allows the CRT monitor 68 to display video graphics at a relatively high rate. At the same time, the frame buffer memory 66 stores most of the video data displayed on the CRT monitors 68 so that the PCI bus 56 needs to provide video data to the VGA controller 64 only when corresponding pixels of the video images change. As a result, the VGA controller 64 and the frame buffer memory 66 minimize the burden on the PCI bus 56.

As mentioned above, the PCI bus 56 is coupled to a PCI-ISA bus bridge 60, which couples the PCI bus 56 to an industry standard architecture ("ISA") bus 70. As is well known in the art, the ISA bus 70 is relatively slow compared to the PCI bus 56. The ISA bus 70 is also connected to various I/O devices such as a flash read-only memory ("ROM") basic input/output system ("BIOS") memory 74 and a conventional controller 78 that interfaces with a keyboard 80 and a mouse pointing device 82.

The PCI-ISA bus bridge 60 also includes an integrated device electronics ("IDE") controller 90 that is coupled to a hard disk drive 92 for the mass storage of data.

As is well known in the art, the operating system stored on the hard disk drive 92 may include screen saver software. The screen saver software causes a screen saver image to be displayed on the CRT monitor 68, typically after the computer system 32 has been idle for more than a pre-determined period. However, screen savers operating in a conventional computer system 32 of the type shown in FIG. 2 exhibit the problems described above. Specifically, computer system 32 may fail to switch to the screen saver mode soon enough after the operator leaves the proximity of the computer system 32. Also, the computer system 32 may repeatedly switch to the screen saver mode throughout the day even though the operator remains in the proximity of the computer system 32. The operator is thus required to repeatedly enter a screen saver password to use the computer throughout the day. The embodiment of the system 30 shown in FIG. 2 avoids these problems by using a proximity sensor 100 that is coupled to a general purpose input port ("GPIO") conventionally included in the PCI-ISA bus bridge 60. The CPU 34 is programmed to periodically poll the proximity sensor 100 through the PCI-ISA bus bridge 60. The proximity sensor 100 may be polled as frequently as each second or faster using a time base provided by a system clock (not shown) included in the computer system 32. The operating system stored on the hard disk drive 92 is programmed to forego initiating the screen saver mode unless polling of the proximity sensor 100 indicates that an operator is no longer present in the proximity of the computer system 32. If the operator leaves the proximity of the computer system 32, the proximity sensor 100 detects his or her absence. When the CPU 34 subsequently polls the proximity sensor 100, the CPU 34 switches the computer system 32 to the screen saver mode either immediately or after a pre-determined time. In the later case, if the operator returns to the proximity of the computer system 32 during this pre-determined period, the computer system 32 is inhibited from switching to the screen saver mode.

Figure 3:
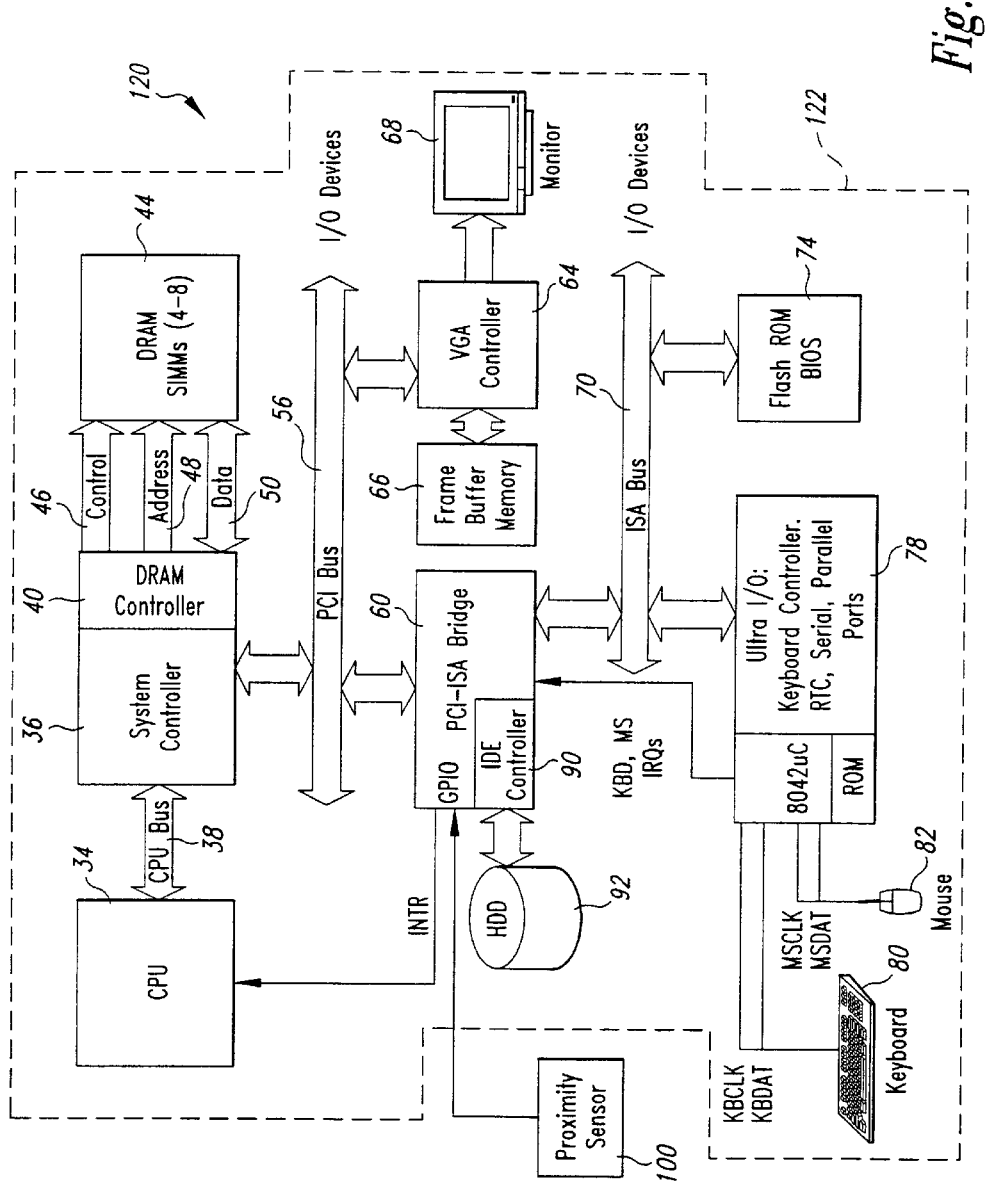
FIG. 3 is a block diagram of an electronic system that operates in accordance with another embodiment of the inventive method by interfacing a computer with a proximity sensor through a keyboard interface microcontroller.

An alternative the embodiment of a system 120 for automatically initiating a screen saver mode is illustrated in FIG. 3. The system 120 includes a conventional computer system 122 containing many of the same components that are in the computer system 32 of FIG. 2. Therefore, in the interest of brevity, these components have been provided with the same reference numerals, and an explanation of their structure and operation will not been repeated.

In the system of 120 of FIG. 3, the proximity sensor 100 is coupled to the keyboard interface microcontroller 78 through a general-purpose input port conventionally included in the microcontroller 78. The proximity sensor 100 is polled as frequently as each second or faster using a time base conventionally provided in the keyboard controller 78. Alternatively, the proximity sensor 100 may be polled as the controller repeatedly executes an internal software loop. When the keyboard controller 78 detects a signal from the proximity sensor 100 indicating the presence of an operator in the proximity of the computer system 122, the keyboard controller 78 initiates a code sequence that simulates activation of a key on the keyboard 80. For example, the code sequence may simulate a null key press (e.g., a "shift key"). Activation of a null key does not generally perform any function in an applications program being executed in the computer system 122. However, screen saver programs are typically programmed to inhibit switching to a screen saver mode for a pre-determined time after any keystroke. Thus, when the keyboard controller 78 initiates a code sequence simulating a key press, the computer system 122 is inhibited from entering the screen saver mode. Using this embodiment, the parameters of the screen saver program can be set to provide a very short delay time to enter the screen saver mode after the computer system 122 has become idle.

Figure 4:
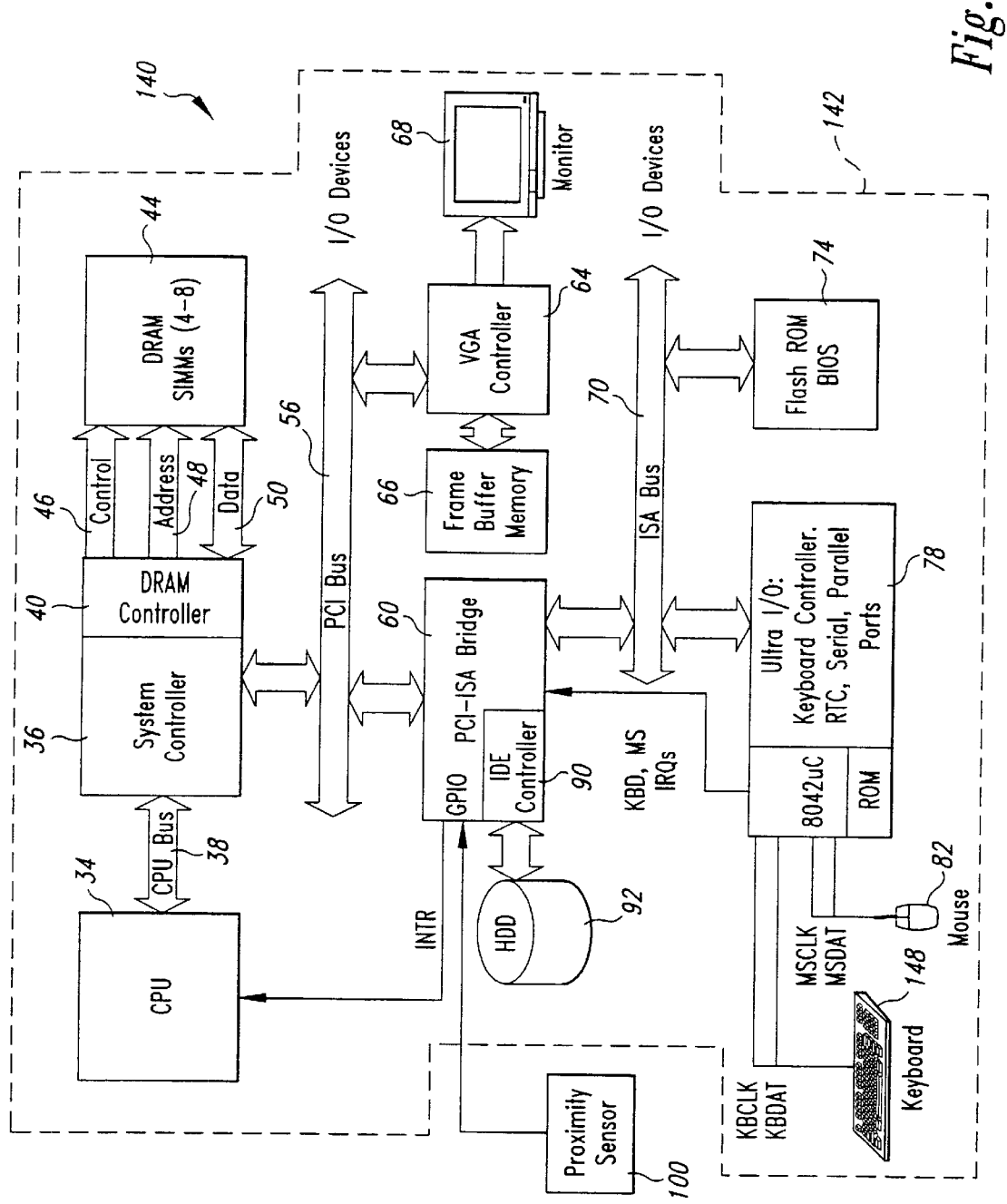
FIG. 4 is a block diagram of an electronic system that operates in accordance with still another embodiment of the inventive method by interfacing a computer with a proximity sensor through a keyboard.

Still another embodiment of a system 140 for automatically initiating a screen saver mode is illustrated in FIG. 4. The system 140 also includes a conventional computer system 142 containing many of the same components that are in the computer system 32 of FIG. 2, which have been provided with the same reference numerals. The proximity sensor 100 is coupled directly to a specially configured keyboard 148. The keyboard interface microcontroller 78 polls the keyboard 148 through the general-purpose input port in the microcontroller 78. The proximity sensor 100 is polled as frequently as each second or faster each time the software controlling the operation of the keyboard interface microcontroller 78 passes through its normal keyboard scan routine. One advantage of the system 140 of FIG. 4 is that it can be implemented simply by replacing the keyboard 80 in a conventional computer system with the keyboard 148.

When the proximity sensor 100 provides a signal indicating the presence of an operator in the proximity of the computer system 142, the signal causes the keyboard 148 to simulate activation of a key on the keyboard 148. For example, a null key press may be simulated. As explained above, a null key press does not generally perform any function but is does inhibit the computer system 142 from switching to a screen saver mode for a predetermined time after the keystroke.

Figure 5:
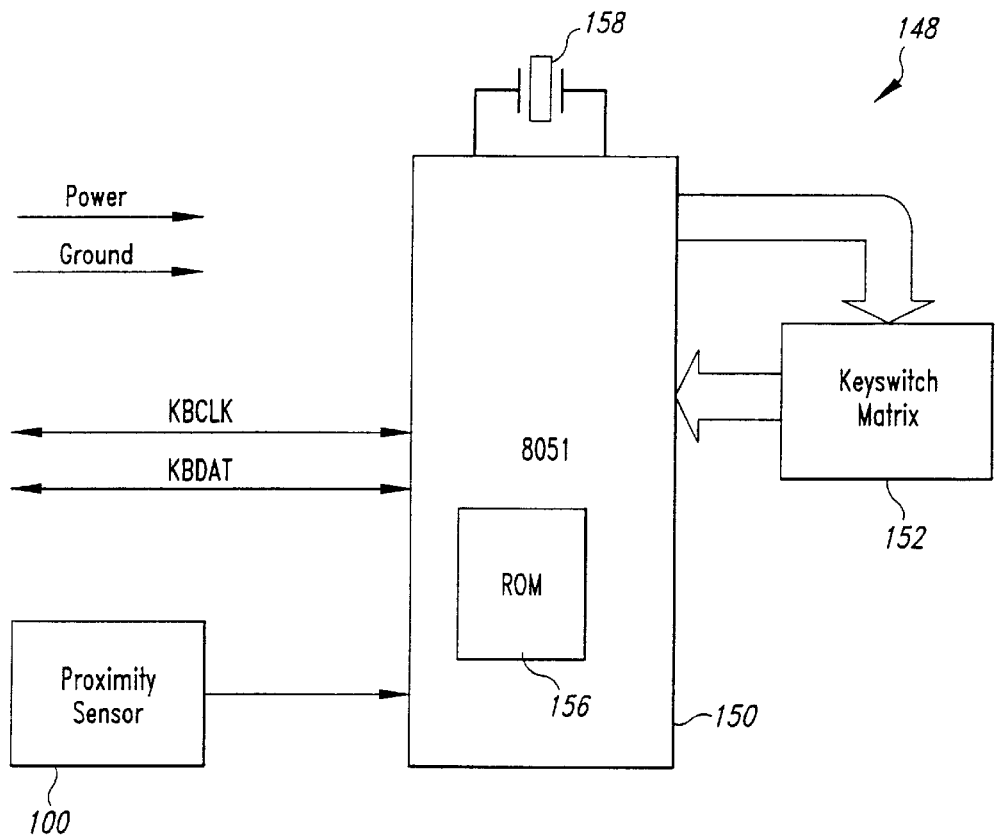
FIG. 5 is a block diagram of the keyboard of FIG. 4 showing the manner in which the proximity sensor interfaces with the keyboard.

One embodiment of a keyboard 148 usable in the system 140 of FIG. 4 is illustrated FIG. 5. The keyboard 148 includes a conventional "8051" controller 150 coupled to a key switch matrix 152 by conventional means. A program stored in a ROM 156 within the controller 150 controls the operation of the controller 150. The controller 150 contains an internal oscillator generating a clock signal having a frequency determined by a crystal 158. The controller 150 outputs the keyboard clock signal on line KBCLK and keyboard data on line KBDAT, both of which are supplied to the keyboard interface controller 78. The proximity sensor 100 is coupled to the controller 150 by conventional means. The embodiment illustrated in FIG. 5 is for a "PS/2" keyboard port. However, an "USB" peripheral port for a keyboard and mouse may also be used.

Figure 6:
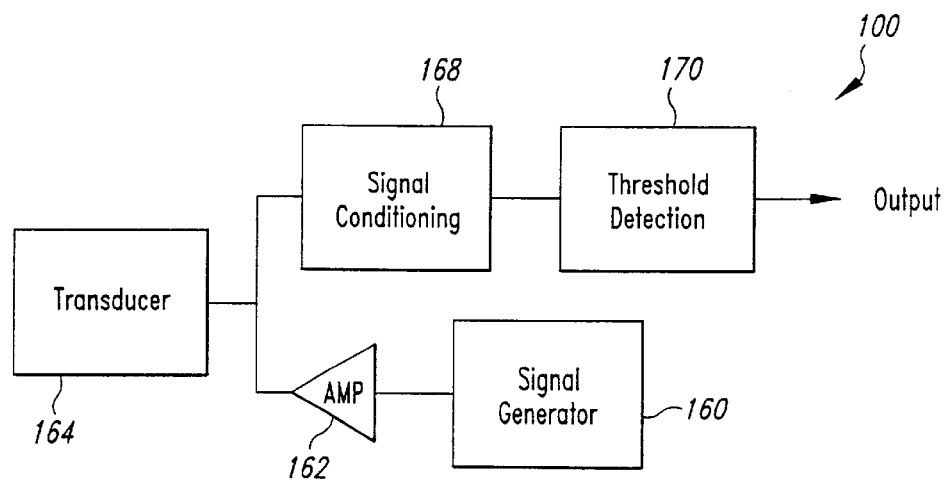
FIG. 6 is a block diagram of one embodiment of a proximity sensor that may be used in the embodiments of FIGS. 2–5.

One embodiment of a proximity sensor 100 is illustrated in FIG. 6. The proximity sensor 100 uses ultrasound reflected from the operator to detect the proximity of the operator adjacent the proximity sensor 100. The proximity sensor 100 includes a signal generator 160 producing an electrical signal having a desired frequency. The output of the signal generator 160 is boosted by an amplifier 162 of conventional design and applied to the input of a conventional ultrasound transducer 164. The transducer 164 then the generates an acoustic signal having a frequency corresponding to the frequency of the electrical signal produced by the signal generator 160. The acoustic signal reflects from objects in the proximity of the computer system, including the operator. These reflections of the acoustic signal strike the transducer 164, which then converts the reflected acoustic signal to a corresponding electrical signal. However, the electrical signal generated by the transducer 164 will mix with the electrical signal applied to the transducer 164 so that a relatively low frequency signal will be generated having a frequency equal to the difference between the electrical signal applied to the transducer 164 and the frequency of the reflected acoustic signal. As the operator moves in the proximity of the transducer 164, the frequency of the reflected acoustic signal will vary because of the Doppler effect. Therefore, if an operator is in the proximity of the proximity sensor 100, a relatively low frequency signal will be present at the output of the transducer 164. This low frequency signal is coupled through a conventional signal conditioning unit 168 that may, for example, filter the high frequency components present at the output of the transducer 164. The signal conditioning unit 168 may also convert the low frequency signal applied to the signal conditioning unit 168 to a direct current ("DC") signal having a magnitude indicative of the amplitude of the low frequency signal. The output of the signal conditioning unit 168 is applied to a threshold detection circuit 170. The threshold detection circuit 170 generates an output signal indicative of the presence of an operator adjacent the proximity sensor 100 whenever the output of the signal conditioning unit 168 exceeds a predetermined magnitude. Thus, the presence or absence of the output signal from the threshold detection circuit 170 indicates whether or not the operator is adjacent the proximity sensor 100.

It will be apparent to one skilled in the art that the components illustrated FIG. 6 may also be configured to operate differently. For example, the signal conditioning unit 168 may be configured to provide a signal indicative of changes in the amplitude of the electrical signal from the transducer 164 corresponding to the reflected acoustic signal. Other alternative designs will also be apparent to one skilled in the art.

While the invention has been described herein by way of exemplary embodiments, various modifications may be made without departing from the spirit and scope of the invention. For example, although the various embodiments of the invention have been described as being methods of operating a system that is an integral part of a computer, it will be understood that the invention may be embodied in methods of operating a separate, stand-alone system that is connected to the computer 10. Accordingly, the invention is not limited except as by the appended claims.

What is claimed is:

1. A method of controlling the operating mode of a computer, comprising:
   detecting whether a person is located proximate the computer, wherein the detecting includes:
      broadcasting a first signal in an area proximate the computer;
      detecting a reflected signal from the person proximate the computer;
      receiving a relatively low frequency signal indicative of a frequency difference between the first signal and the reflected signal;
      converting the relatively low frequency signal to a converted signal indicative of an amplitude of the low frequency signal; and
      comparing the converted signal with a predetermined threshold to determine whether the person is located proximate the computer; and
   allowing the computer to execute a screen saver program responsive to detecting that no persons are located proximate the computer.

2. The method of claim 1 wherein the act of detecting whether a person is located proximate the computer comprises detecting whether there is movement of an object proximate the computer.

3. The method of claim 1 wherein the act of detecting whether a person is located proximate the computer comprises:
   broadcasting ultrasound energy in an area proximate the computer; and
   detecting ultrasound energy reflected from the person proximate the computer.

4. The method of claim 1 wherein the act of detecting whether a person is located proximate the computer comprises:
   broadcasting infrared light in an area proximate the computer; and
   detecting infrared light reflected from the person proximate the computer.

5. The method of claim 1 wherein the act of detecting whether a person is located proximate the computer comprises:
   broadcasting electromagnetic energy in an area proximate the computer; and
   detecting electromagnetic energy reflected from the person proximate the computer.

6. The method of claim 1 wherein the act of detecting whether a person is located proximate the computer comprises detecting the weight of the person at a predetermined location proximate the computer.

7. The method of claim 1 wherein the act of allowing the computer to execute a screen saver program comprises preventing the computer from executing an application program in an unprotected manner unless a password is correctly entered while the computer is executing the screen saver program.

8. A method of controlling the operating mode of a computer, comprising:
   detecting whether a person is located proximate the computer, wherein the detecting includes:
      broadcasting a first signal in an area proximate the computer;

detecting a reflected signal from the person proximate the computer;

receiving a relatively low frequency signal indicative of a frequency difference between the first signal and the reflected signal;

converting the relatively low frequency signal to a converted signal indicative of an amplitude of the low frequency signal; and comparing the converted signal with a predetermined threshold to determine whether the person is located proximate the computer; and allowing the computer to operate in a screen saver mode responsive to detecting that no persons are located proximate the computer.

9. The method of claim 8 wherein the act of detecting whether a person is located proximate the computer comprises detecting whether there is movement of an object proximate the computer.

10. The method of claim 8 wherein the act of detecting whether a person is located proximate the computer comprises:

broadcasting ultrasound energy in an area proximate the computer; and detecting ultrasound energy reflected from the person proximate the computer.

11. The method of claim 8 wherein the act of detecting whether a person is located proximate the computer comprises:

broadcasting infrared light in an area proximate the computer; and detecting infrared light reflected from the person proximate the computer.

12. The method of claim 8 wherein the act of detecting whether a person is located proximate the computer comprises:

broadcasting electromagnetic energy in an area proximate the computer; and detecting electromagnetic energy reflected from the person proximate the computer.

13. The method of claim 8 wherein the act of detecting whether a person is located proximate the computer comprises detecting the weight of the person at a predetermined location proximate the computer.

14. The method of claim 8 wherein the act of allowing the computer to operate in the screen saver mode comprises preventing the computer from executing an application program in an unprotected manner unless a password is correctly entered while the computer is operating in the screen saver mode.

15. A method of controlling the operating mode of a computer, comprising:

detecting whether a person is located proximate the computer, wherein the detecting includes:

broadcasting a first signal in an area proximate the computer;

detecting a reflected signal from the person proximate the computer;

receiving a relatively low frequency signal indicative of a frequency difference between the first signal and the reflected signal;

converting the relatively low frequency signal to a converted signal indicative of an amplitude of the low frequency signal; and comparing the converted signal with a predetermined threshold to determine whether the person is located proximate the computer; and preventing the computer from executing a screen saver program responsive to detecting that the person is located proximate the computer.

16. The method of claim 15 wherein detecting whether a person is located proximate the computer comprises detecting whether there is movement of an object proximate the computer.

17. The method of claim 15 wherein detecting whether a person is located proximate the computer comprises:

broadcasting ultrasound energy in an area proximate the computer; and detecting ultrasound energy reflected from the person proximate the computer.

18. The method of claim 15 wherein detecting whether a person is located proximate the computer comprises:

broadcasting infrared light in an area proximate the computer; and detecting infrared light reflected from the person proximate the computer.

19. The method of claim 15 wherein detecting whether a person is located proximate the computer comprises:

broadcasting electromagnetic energy in an area proximate the computer; and detecting electromagnetic energy reflected from the person proximate the computer.

20. The method of claim 15 wherein detecting whether a person is located proximate the computer comprises detecting the weight of the person at a predetermined location proximate the computer.

21. The method of claim 15 wherein preventing the computer from executing a screen saver program comprises simulating activation of a key on a keyboard.

22. A method of controlling the operating mode of a computer, comprising:

detecting whether a person is located proximate the computer, wherein the detecting includes:

broadcasting a first signal in an area proximate the computer;

detecting a reflected signal from the person proximate the computer;

receiving a relatively low frequency signal indicative of a frequency difference between the first signal and the reflected signal;

converting the relatively low frequency signal to a converted signal indicative of an amplitude of the low frequency signal; and comparing the converted signal with a predetermined threshold to determine whether the person is located proximate the computer;

allowing the computer to operate in a screen saver mode responsive to detecting that no persons are located proximate the computer; and preventing the computer from entering a screen saver mode responsive to detecting that the person is located proximate the computer.

23. The method of claim 22 wherein detecting whether a person is located proximate the computer comprises detecting whether there is movement of an object proximate the computer.

24. The method of claim 22 wherein detecting whether a person is located proximate the computer comprises:

broadcasting ultrasound energy in an area proximate the computer; and detecting ultrasound energy reflected from the person proximate the computer.

25. The method of claim 22 wherein detecting whether a person is located proximate the computer comprises:

broadcasting electromagnetic energy in an area proximate the computer; and detecting electromagnetic energy reflected from the person proximate the computer.

26. The method of claim 22 wherein allowing the computer to operate in a screen saver mode comprises preventing the computer from executing an application programming in an unprotected manner unless a password is correctly entered while the computer is executing a screen saver program.

27. The method of claim 22 wherein preventing the computer from entering a screen saver mode comprises simulating activation of a key on a keyboard.

* * * * *